(12) United States Patent
Wilensky et al.

(10) Patent No.: US 8,406,566 B1
(45) Date of Patent: Mar. 26, 2013

(54) METHODS AND APPARATUS FOR SOFT EDGE MASKING

(75) Inventors: Gregg D. Wilensky, San Francisco, CA (US); Scott D. Cohen, Sunnyvale, CA (US); Alan L. Erickson, Highlands Ranch, CO (US); Jen-Chan Chien, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 413 days.

(21) Appl. No.: 12/789,201

(22) Filed: May 27, 2010

(51) Int. Cl.
*G06K 9/20* (2006.01)
*G06K 9/34* (2006.01)

(52) U.S. Cl. ........................................ 382/283; 382/173

(58) Field of Classification Search .................. 382/283, 382/173
See application file for complete search history.

(56) References Cited

U.S. PATENT DOCUMENTS

| | | | |
|---|---|---|---|
| 5,469,536 A | 11/1995 | Blank | |
| 5,828,379 A * | 10/1998 | Cok | 345/581 |
| 5,852,673 A * | 12/1998 | Young | 382/164 |
| 6,300,955 B1 * | 10/2001 | Zamir | 382/283 |
| 6,323,869 B1 | 11/2001 | Kohm et al. | |
| 6,337,925 B1 * | 1/2002 | Cohen et al. | 382/199 |
| 6,456,297 B1 * | 9/2002 | Wilensky | 345/619 |
| 6,628,295 B2 * | 9/2003 | Wilensky | 345/594 |
| 6,751,343 B1 | 6/2004 | Ferrell et al. | |
| 6,920,250 B1 * | 7/2005 | Kletter et al. | 382/233 |
| 6,940,518 B2 | 9/2005 | Minner et al. | |
| 6,961,922 B1 | 11/2005 | Knutson | |
| 7,295,208 B2 | 11/2007 | White et al. | |
| 7,424,672 B2 | 9/2008 | Simske et al. | |
| 7,831,108 B2 * | 11/2010 | Wilensky et al. | 382/283 |
| 8,209,632 B2 * | 6/2012 | Reid et al. | 715/833 |
| 2007/0188510 A1 * | 8/2007 | Kokemohr | 345/581 |
| 2008/0144970 A1 * | 6/2008 | Wilensky et al. | 382/283 |

FOREIGN PATENT DOCUMENTS

EP 1 179 733 2/2002

OTHER PUBLICATIONS

Sindeyev M and Konushin V, "A Novel Interactive Image Matting Framework" GraphiCon, 2008, pp. 41-45.*
Alvaro Guzman "Photshop Brush Tool: A Basic Guide" Nov. 24, 2009. http://psd.tutsplus.com/tutorials/tools-tips/photoshops-brush-tool-basic-guide/.*
"Adobe Photoshop Elements 8 Guide: How to Make Selections" by Adobe, 2009. http://edexchange.adobe.com/files/97409187c9/PSE8_howto_selections.pdf.*

(Continued)

*Primary Examiner* — Bhavesh Mehta
*Assistant Examiner* — Utpal Shah
(74) *Attorney, Agent, or Firm* — Wolfe-SBMC

(57) ABSTRACT

Methods and apparatus for soft edge masking. A soft edge masking technique may be provided via which, starting from an initial, potentially very rough and approximate border selection mask, the user may selectively apply brush strokes to areas of an image to selectively improve the border region of the mask, thus providing softness details in border regions which contain soft objects such as hair and fur. A stroke may be an additive stroke indicating a particular region in which detail from an original image is to be added to a composite image, or a subtractive stroke indicating a particular region in which detail is to be removed from the composite image. The stroke may also indicate a strength parameter value that may be used to indicate an amount of bias to be used in opacity calculations for the affected pixels.

20 Claims, 19 Drawing Sheets

OTHER PUBLICATIONS

"ARCH 593 Digital Image Media Handout 1.1," Sep. 9, 2004, XP002497709, Virginia University, URL: http://www.arch.virginia.edu/computing/docs/photoshop/Introduction_to_Photoshop.

U.S. Appl. No. 11/633,062, entitled "Coherent Image Selection and Modificiation," filed Dec. 1, 2006, whose inventor is Gregg D. Wilensky.

U.S. Appl. No. 11/633,061, entitled "Coherent Image Selection and Modificiation," filed Dec. 1, 2006, whose inventor is Gregg D. Wilensky.

U.S. Appl. No. 11/610,285, entitled "Universal Front End for Masks, Selections, and Paths," filed Dec. 14, 2006, whose inventors are Gregg D. Wilensky, Jen-Chan Chien, and Sarah A. Kong.

U.S. Appl. No. 10/984,465, entitled "Localization of Activity With Respect to Digital Data," filed Nov. 9, 2004, whose inventor is Gregg D. Wilensky.

U.S. Appl. No. 11/517,189, entitled "Live Coherent Image Selection," filed Sep. 6, 2006, whose inventors are Gregg D. Wilensky, Scott D. Cohen, and Jen-Chan Chien.

U.S. Appl. No. 11/524,219, entitled "Image Mask Generation," filed Sep. 19, 2006, whose inventor is Gregg D. Wilensky.

U.S. Appl. No. 11/607,206, entitled "Improving Image Masks," filed Dec. 1, 2006, whose inventor is Gregg D. Wilensky.

* cited by examiner

METHODS AND APPARATUS FOR SOFT EDGE MASKING

BACKGROUND

Description of the Related Art

Masking is the process of segregating one portion of an image from another. Masking may be used, for example, to provide an image adjustment to a portion of an image or to cut out an object from an image in order to move it or to paste it onto another image. A difficult task in masking is the task of capturing the subtle gradations of soft edges or the rich softness of details such as hair and fur.

Various conventional masking techniques may thus be used to create a mask of an area within an image, and to separate that foreground area from the background. While an initial selection mask may be binary, with a sharp edge, for example defining foreground opacity value F as 1.0 and background opacity value B as 0.0, the desired mask may not be binary; as some pixels may have colors mixed in through the foreground and background (i.e., may have an opacity value between F and B). For example, around the boundary of the foreground object, the pixel color may be a mixture of the light from the object and from the background. Masking techniques may thus need to identify, for example, that a particular border pixel is 75% foreground, 25% background, and thus set the opacity for the pixel at 0.75. For much of the object, the central portions not near the boundary, the opacity is 1.0 (entirely foreground). Background opacity is 0.0. Note that, while 0.0 is used for background opacity B and 1.0 is used for foreground opacity F in this description, these values are used as a convention, and the values could be reversed, or other values could be used for F and B.

A difficult task in masking is thus when the foreground object has a "fuzzy" edge—hair, fur, etc. In such a region, in a somewhat complicated geometry, the opacity may change rapidly from background to foreground and back to background quite rapidly, within a very few pixels.

Conventional image processing software may provide a number of techniques for masking an object in an image. Some such conventional techniques allow the user to indicate, for example using brush strokes, the foreground image region and the non-foreground (background) region(s). In some conventional techniques, the user may manually draw a rough selection using a selection tool such as a rectangular or elliptical selection tool or a lasso tool. Some conventional techniques may automatically determine a rough selection of the foreground and background. Depending upon the relative colors in the foreground object and the background image as indicated by one of these conventional techniques, a mask may be automatically generated by selecting or combining one or more color channels (such as red or green or blue (RGB color space) or cyan or magenta or yellow or black (CMYK color space) or lightness or chrominance (Lab color space)).

The following describes an example conventional masking workflow that may be implemented in conventional image processing software. A conventional technique or tool, for example as described above, may be used to produce a rough selection of the object of interest in the image. This may generate a rough, binary selection mask. Another conventional technique or tool may be used to refine the edge of the rough selection. This conventional technique may be used to bring out some softness in the selection mask within a specified area or border around the initial rough selection edge. In this technique, within the border area centered upon the incoming selection and with a spatial width of 2 times a specified radius, the image colors and incoming selection mask values are analyzed to produce a refined selection mask in which at least some pixels around the boundary have mask values between 0.0 (background) and 1.0 (foreground).

However, this conventional masking process is semi-global in nature, which means that it affects the whole image edge vicinity. Often, this semi-global process is insufficient to produce a good mask for objects that have varying edge characteristics (or "fuzzy" edges), for example that have hair or fur. Portions of the edge may be very hard, portions may have a certain limited spatial extent of softness, and yet others may have extensive spatial softness. A semi-global adjustment cannot capture all of this subtlety. A smaller radius may not capture all of the soft features on the boundary such as hair, while a larger radius may not produce good results in more sharply-defined border regions where, for example, there is no hair or fur. Using these conventional techniques, the user may often be left with a difficult, time-consuming manual process to improve the mask, for example by laboriously "painting in" details on the mask, if so desired.

SUMMARY

Various embodiments of methods and apparatus for soft edge masking are described. Embodiments may provide a brush tool that, by the application of one or more strokes to an image, may bring out detail in a selection opacity mask that distinguishes foreground image regions from background regions. Using embodiments of a soft edge masking technique, starting from an initial, potentially very rough and approximate border selection mask, a process of brushing over portions of the image may be used to selectively improve portions of the border of the mask, and may thus provide softness details in regions which contain soft objects such as hair and fur.

In some embodiments, an original image and a rough selection mask of an object in the original image may be obtained. The rough selection mask may be generated by any of a variety of manual or automatic techniques, or by a technique that combines manual actions with automatic mask generation. Input may be obtained to form a composite image from a background image and the object from the original image selected according to the rough selection mask.

At least one input (for example, a brush stroke) may be received indicating at least one region along the border of the object in which detail is to be adjusted in the composite image. For example, a brush tool may be provided through a user interface to a soft edge masking module via which the user may draw strokes on the composite image (or, alternatively, on the original image) to indicate the one or more regions. In some embodiments, an input (e.g., a stroke) may be an additive input indicating a particular region in which detail from the original image is to be added to the composite image, or a subtractive input indicating a particular region in which detail is to be removed from the composite image. The input (e.g., a stroke) may also indicate a strength parameter value that may be used to indicate an amount of bias to be used in opacity calculations for the affected pixels.

Detail in the indicated at least one region of the composite image may be adjusted according to the at least one input. Detail from the original image may be added to the composite image for additive input (e.g., a brush stroke in add mode), or detail may be subtracted from the composite image for subtractive input (e.g., a brush stroke in subtract mode). A strength parameter value may be associated with each input (e.g., with each brush stroke), and may be used to bias the amount of detail that is added to or removed from the composite image.

Figure 1:
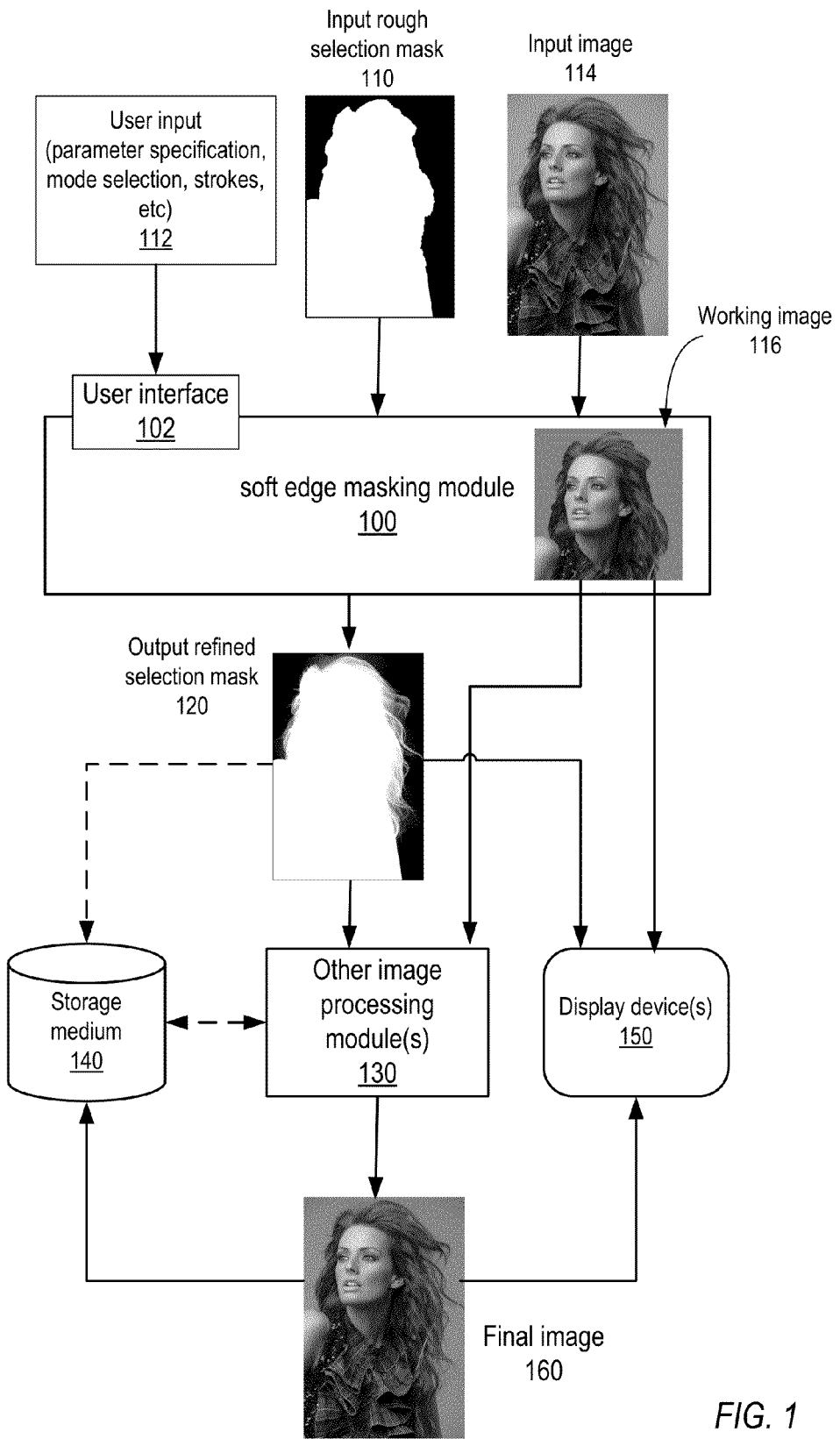
FIG. 1 illustrates a module that may implement a soft edge masking technique, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for soft edge masking are described. Masking is the process of segregating one portion of an image from another. Masking may be used, for example, to provide an image adjustment to a portion of an image or to cut out an object from an image in order to move it or to paste it onto another image. A difficult task in masking is the task of capturing the subtle gradations of soft edges or the rich softness of details such as hair and fur. Conventional techniques for refining rough selection masks are semi-global in nature, and thus cannot capture all of the subtlety and details. Embodiments may provide a brush tool that, by the application of one or more strokes to an image, may bring out detail in a selection opacity mask that distinguishes foreground image regions from background regions. Using embodiments of a soft edge masking technique as described herein, starting from an initial, potentially very rough and approximate border selection mask, a process of brushing over portions of the image may be used to selectively improve portions of the border of the mask, and may thus provide softness details in regions which contain soft objects such as hair and fur. If the user is happy with harder portions of the boundary, the user can use the brush to brush over softer regions (e.g. hair) that were not captured well in the original, rough selection mask to bring out the details of hair, fur, or other more complicated geometries.

Figure 3A:
FIGS. 3A through 3H illustrate an example workflow using an embodiment of the soft edge masking module, according to some embodiments.
Figure 3B:
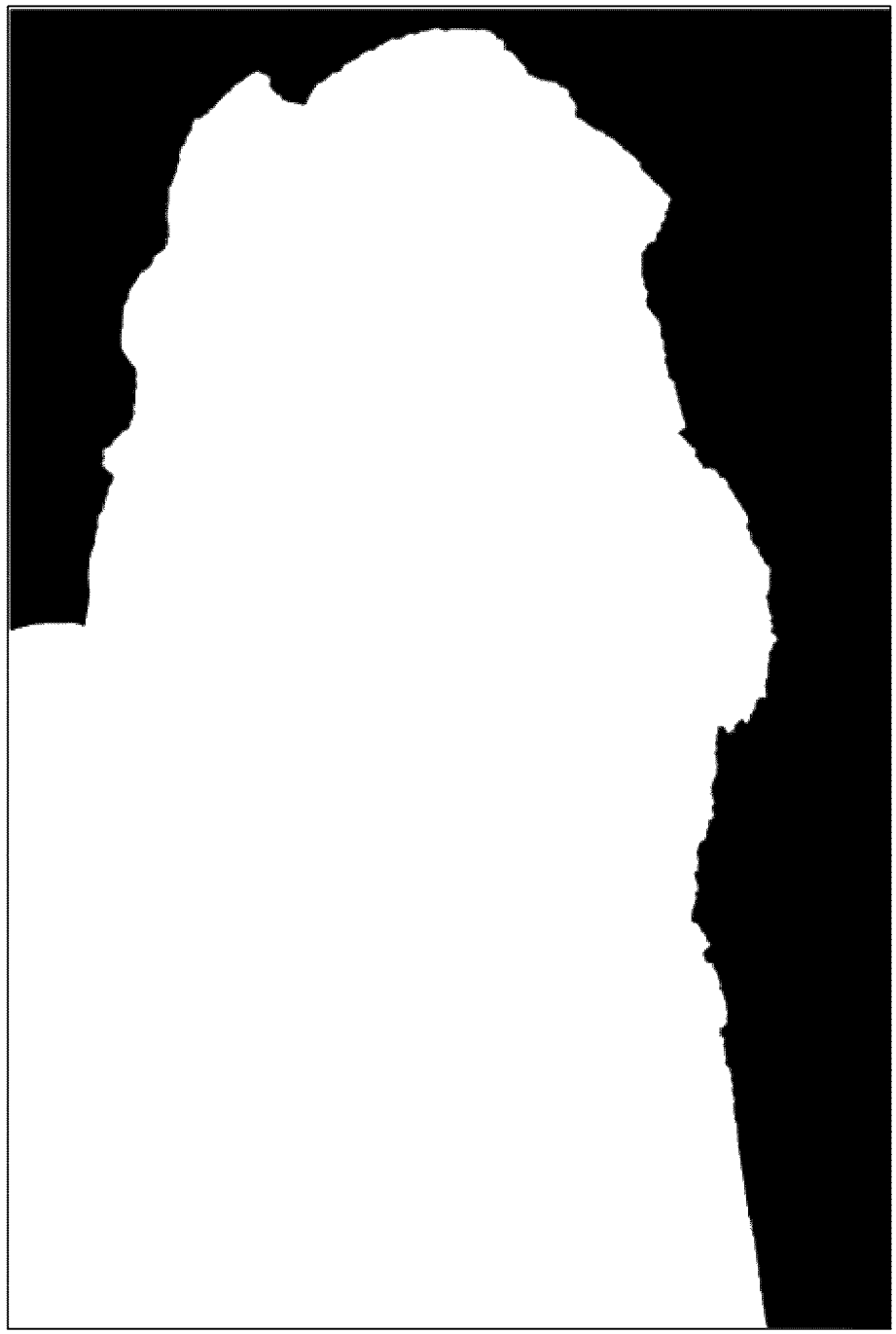

As an example, using embodiments of the soft edge masking technique, a user may start with a very rough (and possibly automatically selected) border selection mask generated for an image of a model, for example as shown in FIG. 3A. However, the border selection mask may not capture all of the intricacies of the model's hair, as shown in FIG. 3B. For example, there may be locks of hair blowing in the wind. The initial selection may cut them off and thus not capture each hair. However, using embodiments of the soft edge masking technique as described herein, the user may selectively specify particular regions of the image in which the border selection mask is to be refined to selectively capture details such as fine hair details, as illustrated in FIGS. 3C-3H. An example of a system and method for generating selection masks is described in U.S. patent application Ser. No. 11/633,062, entitled "COHERENT IMAGE SELECTION AND MODIFICIATION," filed Dec. 1, 2006, whose inventor is Gregg D. Wilensky, and which is hereby incorporated by reference herein in its entirety. Another example of a system and method for generating selection masks is described in U.S. patent application Ser. No. 11/633,061, entitled "COHERENT IMAGE SELECTION AND MODIFICIA- TION," filed Dec. 1, 2006, whose inventor is Gregg D. Wilensky, and which is hereby incorporated by reference herein in its entirety.

Embodiments of the soft edge masking technique may simplify and speed up the process of producing high quality soft image masks. Using embodiments of the soft edge masking technique, what took a large amount of manual effort using conventional techniques may be achieved relatively easily. Whereas conventional techniques are limited to producing a refined mask within a border region in the vicinity of the incoming selection edge, embodiments remove this limitation by giving the user the ability to arbitrarily specify image regions for which more mask detail is needed.

Figure 6:
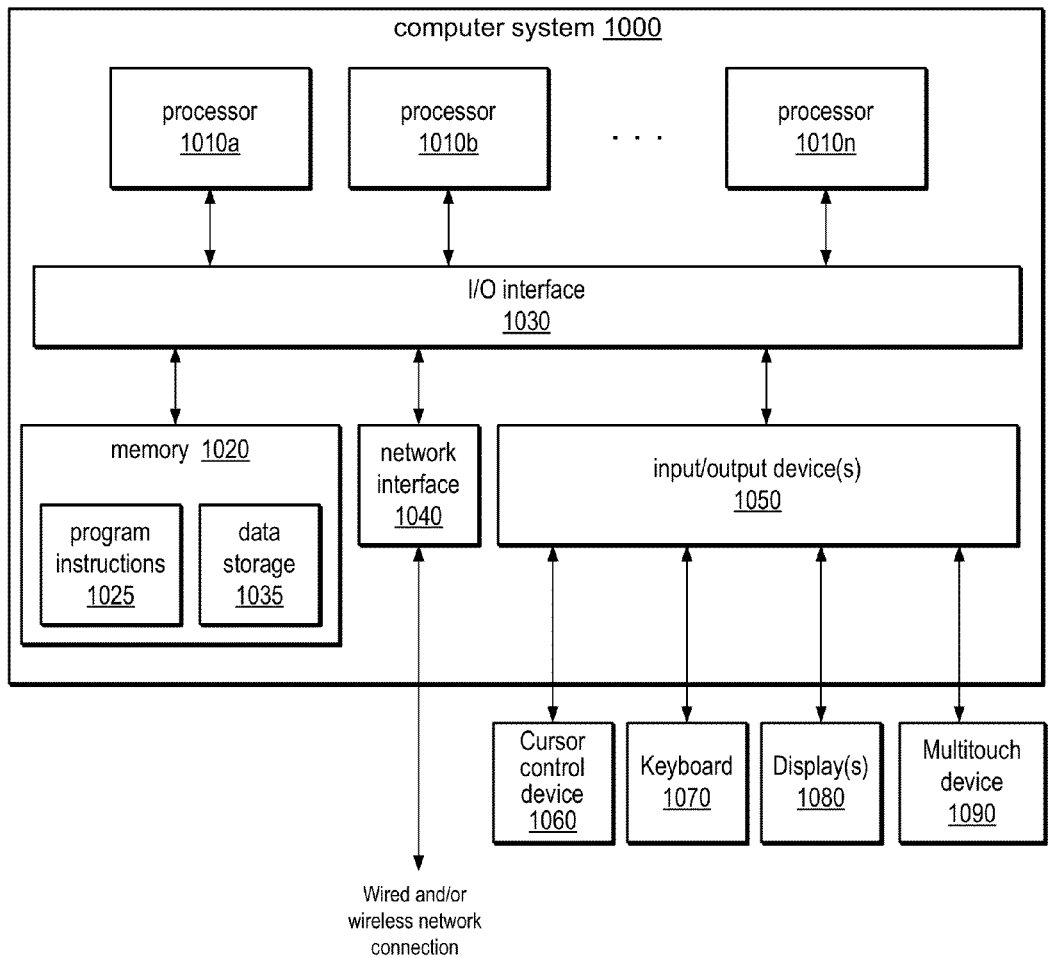
FIG. 6 illustrates an example computer system that may be used in embodiments.

Embodiments of the soft edge masking technique as described herein may be implemented as or in a stand-alone application or as a module of or plug-in for a graphics application or graphics library that may provide other graphical/digital image processing tools. An implementation of the soft edge masking technique may be referred to as a soft edge masking module. Embodiments of a soft edge masking module may, for example, be implemented as a stand-alone tool in an application, or as a pre-processing step for image processing operations such as generating object masks or mattes. Examples of types of applications in which embodiments of the soft edge masking module may be implemented include, but are not limited to, scientific, medical, painting, publishing, digital photography, video editing, games, animation, and/or other applications in which digital image processing may be performed. Specific examples of applications in which embodiments may be implemented may include, but are not limited to, Adobe® Photoshop®, Adobe® Illustrator®, and Adobe® After Effects®. FIG. 1 shows an example of a soft edge masking module. FIG. 6 shows an example system on which embodiments of the soft edge masking module may be implemented.

Embodiments of the soft edge masking module may be used to locally refine masks used in processing single digital images or masks used in processing two or more digital images (e.g., in panoramic image processing). Embodiments may also be applied to refine masks used in processing digital video frames. In general, embodiments may be applied to locally refine masks used in any type of digital image processing. Furthermore, while embodiments are generally described as being applied to color image processing, embodiments may also be applied to grayscale images.

An example of a digital image processing system and method in which at least some embodiments may be implemented to refine selection masks is described in U.S. patent application Ser. No. 11/610,285, entitled "Universal Front End for Masks, Selections, and Paths," filed Dec. 14, 2006, whose inventors are Gregg D. Wilensky, Jen-Chan Chien, and Sarah A. Kong, and which is hereby incorporated by reference herein in its entirety. Another example of a digital image processing system and method in which at least some embodiments may be implemented to refine selection masks is described in U.S. patent application Ser. No. 10/984,465, entitled "LOCALIZATION OF ACTIVITY WITH RESPECT TO DIGITAL DATA," filed Nov. 9, 2004, whose inventor is Gregg D. Wilensky, and which is hereby incorporated by reference herein in its entirety. Yet another example of a digital image processing system and method in which at least some embodiments may be implemented to refine selection masks is described in U.S. patent application Ser. No. 11/517,189, entitled "LIVE COHERENT IMAGE SELECTION," filed Sep. 6, 2006, whose inventors are Gregg D. Wilensky, Scott D. Cohen, and Jen-Chan Chien, and which is hereby incorporated by reference herein in its entirety.

FIG. 1 illustrates an example module that may implement a soft edge masking technique, according to some embodiments. FIG. 6 illustrates an example computer system on which embodiments of soft edge masking module 100 may be implemented. Soft edge masking module 100 may receive as input a rough selection mask 110 and an original image 114. A working image 116 may be displayed. The working image 116 may be initially displayed as a selection from the original image 114 according to the initial rough selection mask 110. Module 100 may receive user input 112, via user interface 102, activating a soft edge masking brush, and in some embodiments may receive additional user input 112 specifying one or more parameters for the brush (e.g., a brush stroke radius parameter that indicates how "wide" the brush stroke is and/or a brush strength parameter, further described later in this document) and/or selecting from among two or more modes (e.g., an add mode and a subtract mode, further described later in this document) for the brush. Controlling this brush, for example via a cursor control device such as a mouse or trackball, the user may apply one or more strokes as user input 112 to the image (e.g., working image 116) displayed on the display device 150 to selectively specify particular regions of the image 116 in which additional detail is to be added to the mask 110.

A stroke may be performed on a single point. In other words, the user may position the brush over a point and perform an initiating event (e.g., a mouse button down event) and an ending event (e.g., a mouse button released or up event) over the point. In addition, a stroke may include multiple points. In other words, the user may position the brush over a point, perform an initiating event, move the brush, for example using the cursor control device, and perform an ending event. Thus, the brush may be used to "paint" a region that the user wishes to add more detail to.

After one or more strokes have been applied to the image, module 100 then automatically refines the mask 110 according to the one or more strokes received via the user interface 102 to generate as output a refined selection mask 120. Image data from input image 114, as well as original mask data from mask 110, may be used in this automatic refinement process. The module 100 looks at the underlying original image to determine where the detail is that was missed in the initial mask.

The refined selection mask 120 may, for example, be stored to a storage medium 140, such as system memory, a disk drive, DVD, CD, etc, and/or displayed to a display device 150. The user may, if desired, activate other image processing modules 130 to perform other image processing tasks on the working image 116 using the generated selection mask 120 to generate a final composite image 160. Final image 160 (as well as one or more intermediary images, if desired) may, for example, be stored to a storage medium 140, such as system memory, a disk drive, DVD, CD, etc, and/or displayed to a display device 150.

In some embodiments, as an alternative to a brush controlled via a cursor control device such as a mouse, a touch- or multitouch-enabled device may be used to apply the one or more strokes to an image, and/or to perform other user input tasks.

Conventional touch-enabled technologies (e.g. conventional computer touchpads or touchscreens) recognize only one touch point. Multitouch is a technology that provides hardware and software that allows computer users to control various applications via the manipulation of multiple digits on the surface of (or, for some devices, proximate to) a multitouch-enabled device. Multitouch technology generally consists of a multitouch-enabled device (referred to as a multitouch device) such as a touch-sensitive display device (computer display, screen, table, wall, etc.), touchpad, tablet, etc., as well as software that recognizes multiple, substantially simultaneous touch points on the surface of the multitouch device.

In some embodiments, soft edge masking module 100 may provide two or more modes for the brush. The user interface 102 to module 100 may provide one or more user interface elements via which the user can select among the two or more brush modes. For example, in some embodiments, an add mode and a subtract mode may be provided. In add mode, the user may use the brush to specify one or more regions in which additional detail is to be added to the mask 110. In subtract mode, the user may use the brush to subtract detail from parts or all of previously specified regions that were added to the mask 110 using the brush in add mode. In some embodiments, using the brush in subtract mode does not directly affect the original rough selection mask 110; that is, applying the brush in subtract mode only removes detail in regions that were added using the brush, and does not subtract from the original mask 110.

In some embodiments, a stroke using the brush may involve an initiating event (e.g., a mouse button down event) and an ending event (e.g., a mouse button released or up event). In some embodiments, the soft edge masking module 100 may not update the displayed working image 116 with a refined selection until after the ending event. In other embodiments, the soft edge masking module 100 may provide immediate updates to the displayed working image 116 during a stroke (e.g., before the ending event). This provides immediate feedback to the user of the changes that are made.

Figure 2A:
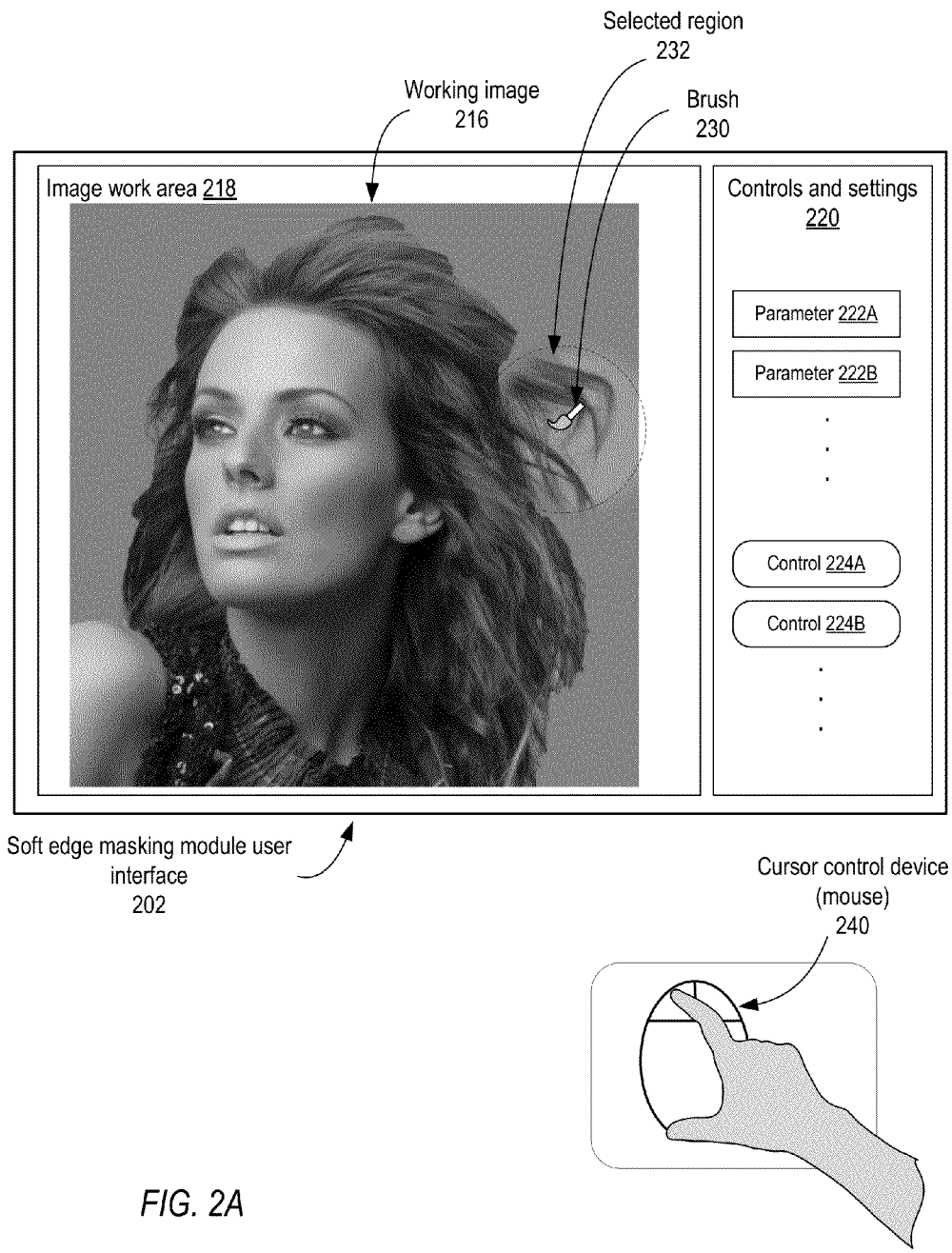
FIGS. 2A and 2B illustrate example user interfaces to a soft edge masking module, according to some embodiments.
Figure 2B:
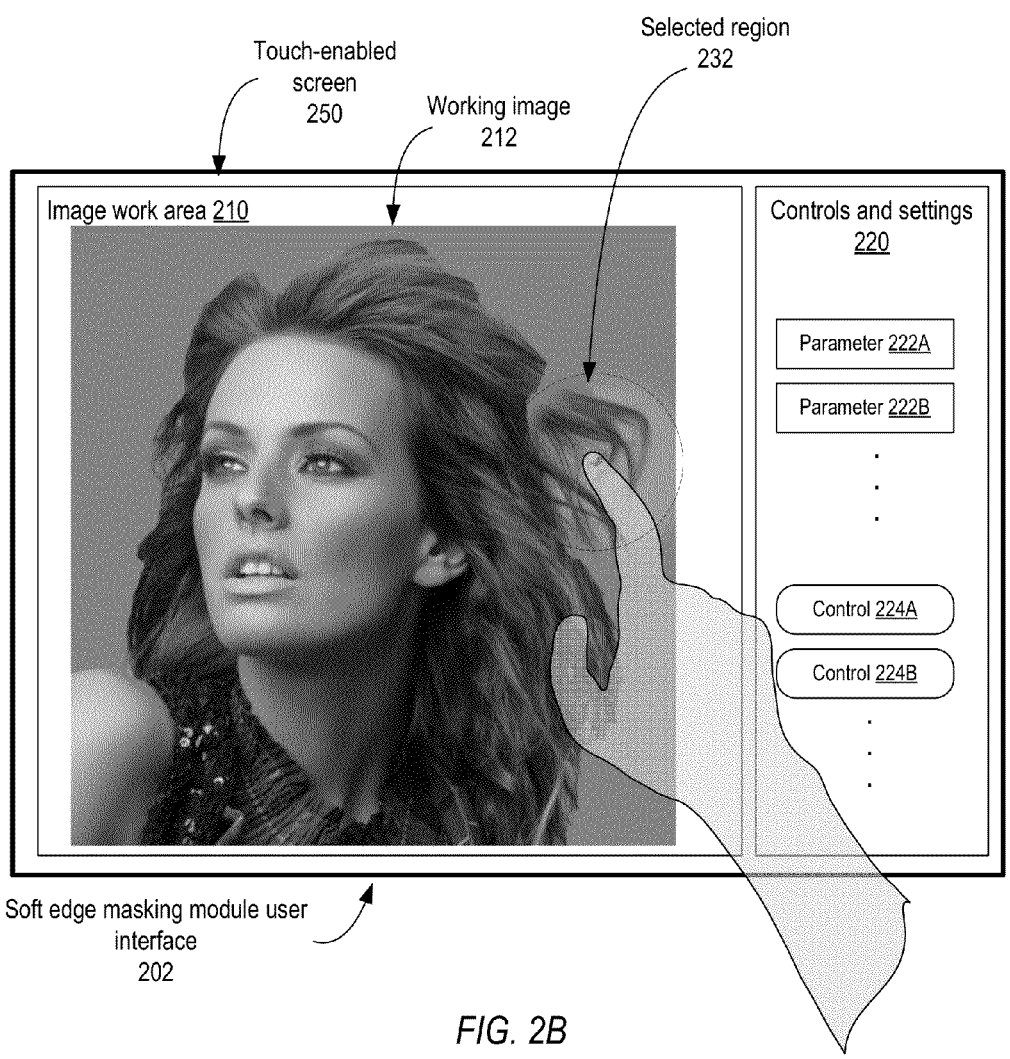

FIGS. 2A and 2B illustrate example user interfaces to a soft edge masking module, according to some embodiments. Soft edge masking module 100 may provide a user interface 202 via which a user may interact with the module 100, for example to activate a soft edge masking brush 230, receive user input specifying one or more parameters 222 for the brush 230 and/or selecting from among two or more modes for the brush 230, and apply one or more strokes to a working image 216 to selectively specify particular regions of the image 212 in which additional detail is to be added to the selection mask. FIG. 2A shows an example soft edge masking module user interface 202 that may include a control and settings area 220 which may include one or more user interface elements, such as parameter specification user interface elements 222 and control user interface elements 224. These user interface elements may, for example, include one or more of alphanumeric text entry boxes, menus, dials, slider bars, buttons, check boxes, radio buttons, or other types of user interface elements that may be used to specify or select values or settings for the soft edge masking module 100 and/or brush 230.

Soft edge masking module user interface 202 may also include an image work area 218 on which a selected or specified working image 216 may be displayed. Note that the working image 216 may be initially displayed as a selection from the original image (see image 114 of FIG. 1) according to the initial rough selection mask (see mask 110 of FIG. 1). Controlling the brush 230, for example via a cursor control device 240 such as a mouse or trackball, the user may apply one or more strokes to the image 216 to selectively specify particular regions of the image 216 (e.g., region 232) in which additional detail is to be added to the mask.

FIG. 2B shows an example soft edge masking module user interface 202 similar to that shown in FIG. 2A. However, in this example, the user interface 202 is displayed on a touch-enabled screen 250. Instead of manipulating a brush with a cursor control device to apply strokes to image 212, the user may use a finger, or alternatively some other instrument, to apply strokes to image 212.

FIGS. 2A and 2B show the brush stroke being applied to a displayed working image 216. In some embodiments, the user interface 202 may provide one or more user interface elements that allow the user to selectively display the original image (see, e.g., input image 114 of FIG. 1) and to apply brush strokes directly on the original image, with the results of the brush strokes being applied to the working image 216 and the selection mask. This allows the user to more readily see the regions in which brush strokes may be needed.

Soft Edge Masking Module Processing

Embodiments of the soft edge masking module 100 may provide a brush tool that may be used to selectively apply strokes to an image, as shown in FIG. 2A. Alternatively, other technologies, such as touch or multitouch technologies, may be used to apply strokes to the image, as shown in FIG. 2B. The image colors, along with an input selection mask (possibly very rough and inaccurate), and possibly a border mask (see, e.g., FIG. 4D) may then be analyzed by the soft edge masking module 100 to produce an improved or refined selection mask in the region specified by the stroke.

In some embodiments, the soft edge masking module 100 may perform a semi-global calculation of the refined selection mask throughout the border regions, which may include a radius-specified border region or border mask around the original input selection edge along with all of the strokes applied to the image, and which effectively stamps the brushed shape onto the input selection mask to generate a refined selection mask. The result of this calculation may then be displayed to the user. The effect is to bring out mask detail wherever a stroke has been applied. In some embodiments, the user may select, via the user interface, to display the mask directly as a gray-scale (black white and shades of gray) image. Alternatively a composite display may be selected, via the user interface, in which the generated refined selection mask may be used to composite the object selected from the original image using the selection mask with a new background image such as a solid color or a gradient image, or some other image of the user's choosing.

In some embodiments, the brush is effectively being applied to update the border region that determines where the mask processing is to occur, and then reveals that updated region to the user. Thus, a local brush stroke may trigger a global update of the refined mask calculation. In other embodiments, the mask refinement calculation may be performed only over the brushed region by solving a localized problem restricted to the brushed area and with boundary conditions that specify the problem inputs on the periphery of the brushed area. In some embodiments, the mask refinement calculation may be performed over a region larger than the brushed region but not globally relative to the border region.

In some embodiments, the algorithm that refines the selection mask according to the input strokes may use the initial selection mask to determine foreground and background colors in the original image near where the user has brushed; these foreground and background colors may be used by the algorithm in performing the mask adjustments. In some embodiments, if a border mask is available (see, e.g., FIG. 4D), the border mask may be used to provide additional foreground and background information to the algorithm from outside the exact brush area. For example, the border mask may indicate to the algorithm areas in which the foreground and background are uncertain, and thus the algorithm may look "inside" the border mask to find foreground colors and "outside" the border mask to find background colors.

Thus, if an initial selection mask is available but there is no border mask, then when the user performs a stroke with the brush, the algorithm may obtain some information about the foreground and background colors from the initial selection mask. However, if there is a border mask, more information is available to the algorithm. The border mask near where the user has applied the stroke using the brush hit tells the algorithm that there are other pixels nearby for which the foreground and background content is uncertain; these pixels should not be used to determine the foreground and the background. Instead, the algorithm examines other pixels inside the initial selection mask that are not in that border mask region to determine the foreground, and examines other pixels outside the border mask region to determine the background.

Brush Characteristics and Parameters

Brush Modes

In some embodiments, soft edge masking module 100 may provide two or more modes for the brush. The user interface may provide one or more user interface elements via which the user can select among the two or more brush modes. For example, in some embodiments, an add mode and a subtract mode may be provided. In add mode, the user may use the brush to specify one or more regions in which additional detail is to be added to the mask. In subtract mode, the user may use the brush to subtract detail from parts or all of previously specified regions that were added to the mask using the brush in add mode. In some embodiments, using the brush in subtract mode does not directly affect the original rough selection mask; that is, applying the brush in subtract mode only removes detail in regions that were added using the brush, and does not subtract from the original mask.

Brush Stamp Shape and Stroke Radius

Embodiments may use arbitrary brush stamp shapes. In some embodiments, the user interface may provide one or more user interface elements via which a user may specify a brush stamp shape. In some embodiments, the user interface may provide one or more user interface elements via which a user may specify a brush stroke radius that indicates how "wide" the brush stroke is.

Brush Strength

A brush strength parameter may be used to specify the strength of the detail which is to be brought out. In some embodiments, the brush strength may be fixed, for example at 100%. In other embodiments, the user interface may provide one or more user interface elements via which a user may specify the brush strength over a range from a lowest setting to a highest setting, for example from 0 to 100%. Intermediate values in the range may be used to control the strength of the detail that is brought out. This may be implemented, for example, by using the brush strength value to determine a foreground or background bias term, for example, using a function such as a linear relationship, or a nonlinear function. This bias term may then be added to an energy function that may be minimized by a mask refinement algorithm implemented by, or called by, the soft edge masking module 100. The bias term acts to bias the color coefficient vector of the model away from zero.

For example, if the user is concerned about bringing out too much detail in a region, or bringing out something in the background, the brush strength parameter may be adjusted downward from 100%. If at 100%, the fully computed results will be shown; if at 50%, the results may be tapered or reduced by a factor of 0.5.

In some embodiments, the brush strength parameter (e.g., selectively set at 0.5) may be used to influence the algorithm that computes the opacity value at pixels in the mask. The brush strength parameter may thus be incorporated into the underlying algorithm that computes the opacity values of the mask pixels. For example, the brush strength value may be used as a bias in the algorithm. If the brush strength value is 90 or 100%, the algorithm brings out much more detail or as much detail as possible, respectively; these settings bias the opacity calculation towards the foreground, towards an opacity of F (e.g., 1.0). If the brush strength value is 10%, the algorithm just brings out a little more detail; this biases the opacity calculation towards the background, towards an opacity of B (e.g., 0.0).

Note that, in some embodiments, the brush strength parameter may also be used with the brush in subtract mode to similarly bias the calculations as to how much detail is to be removed.

Opacity Calculations

The following describes an example basic model for calculating opacity at pixel locations. Also described is an example method of using the brush strength value described above to bias the opacity towards foreground F (e.g., 1.0) or background B (e.g., 0.0) that may be used in some embodiments of the soft edge masking module.

The example basic model for calculating opacity at a pixel location r is as follows:

$$\text{Opacity}(r) = \lambda(r) \quad \text{Color}(r) = \lambda_1(r) + \lambda_{red}(r)^* \text{red}(r) + \lambda_{green}(r)^* \text{green}(r) + \lambda_{blue}(r)^* \text{blue}(r)$$

where r is a pixel location on the image, $\text{Color}(r) = (\text{red}(r), \text{green}(r), \text{blue}(r))$ is the input image giving the color at each pixel r, and:

$$\lambda_r(r) = (\lambda_1(r), \lambda_{red}(r), \lambda_{green}(r), \lambda_{blue}(r))$$

is an unknown parameter vector at pixel r. The algorithm needs to solve for $\lambda(r)$ at each pixel r in order to determine the output opacity. A model for calculating opacity at pixel locations in a mask was described in U.S. patent application Ser. No. 11/524,219, entitled "IMAGE MASK GENERATION," filed Sep. 19, 2006, whose inventor is Gregg D. Wilensky, and which is hereby incorporated by reference herein in its entirety. Another model for calculating opacity at pixel locations in a mask was described in U.S. patent application Ser. No. 11/607,206, entitled "Improving Image Masks," filed Dec. 1, 2006, whose inventor is Gregg D. Wilensky, and which is hereby incorporated by reference herein in its entirety.

The objective function for solving for $\lambda(r)$ provides a regularization on $\lambda$. In the basic model, a regularization term in the energy function is shown in brackets below:

$$E(\lambda) = \ldots + [\mu^{2*}\lambda_{red}(r)^2 + \mu^{2*}\lambda_{green}(r)^2 + \mu^{2*}\lambda_{blue}(r)^2] \quad (1)$$

where $\mu > 0$ and the energy E is being minimized. Note that $\lambda_1(r)$ does not appear in this regularization. This regularization biases the result toward:

$$\lambda_{red}(r) = \lambda_{green}(r) = \lambda_{blue}(r) = 0$$

and consequently:

$$\text{Opacity}(r) = \lambda_1(r).$$

In general, $\lambda$ is also encouraged to be smooth over the image, and so the regularization in equation (1) biases the Opacity toward being constant over the image. Or, if it is assumed that $\lambda$ is constant in a small area (as is typical in some formulations), then the regularization in equation (1) biases the Opacity toward being constant over that small area.

In at least some embodiments of the soft edge masking module, the regularization is changed so that the Opacity can be biased towards 0 or 1. One technique that may be used in some embodiments uses a different regularization term as shown in brackets below:

$$E(\lambda) = \ldots + [\mu_1^{2*}(\lambda_1(r)-a)^2 + \mu^{2*}\lambda_{red}(r)^2 + \mu^{2*}\lambda_{green}(r)^2 + \mu^{2*}\lambda_{blue}(r)^2] \quad (2)$$

that includes a new term $(\mu_1^{2*}(\lambda_1(r)-a)^2$ mu 1 ^2*(lambda_ 1(r)-a)^2) with parameters $\mu_1$ and a, where $\mu_1 > 0$. This regularization biases $\lambda(r)$ toward:

$$(\lambda_1(r), \lambda_{red}(r), \lambda_{green}(r), \lambda_{blue}(r)) = (a, 0, 0, 0)$$

and therefore biases Opacity(r) toward the value a. Note that a may, for example, be a function of pixel position a=a(r) if it is desired to bias the result toward different values in different parts of the image. For example, if not enough of the hair in an example image was brought out in some area, a(r) may be set to 1 in that area to bias the computation toward selecting more hair details. As another example, if too much of the background was included in the selection in another area, a(r) may be set to 0 in that area to bias the computation toward selecting less detail. Incorporating a dependence of $\mu_1$ and a on the pixel location r yields:

$$E(\lambda) = \ldots + [\mu_1(r)^{2*}(\lambda_1(r)-a(r))^2 + \mu^{2*}\lambda_{red}(r)^2 + \mu^{2*}\lambda_{green}(r)^2 + \mu^{2*}\lambda_{blue}(r)^2] \quad (3)$$

Thus, embodiments may provide methods whereby a(r) and $\mu_1(r)$ may be adjusted inside where the user brushes in order to improve the previously computed result. Increasing $\mu_1(r)$ will increase the bias of the Opacity toward a(r). Note that $\mu_1$ can also be a function of r, for example increasing as the user brushes more and more over a certain area to indicate that the user wants a stronger effect. If the user picks an "add" detail brush (e.g., a brush tool set to add mode) which indicates that the user wants to add more to the selection, then a(r) may be set to 1 inside the brush (in some embodiments, with a smooth falloff near the brush edge to avoid artifacts) and then re-optimize E locally within the brush. If the user picks a "remove" detail brush (e.g., a brush tool set to subtract mode), then a(r) may be set to 0 inside the brush.

Thus, some embodiments may provide two local brushes: an "add detail" brush (e.g., a brush tool set to add mode) and a "remove detail" brush (e.g., a brush tool set to subtract mode) that bias the opacity result towards 1 or 0, respectively, within the brush hit or stroke. The above-described technique and equations provide an example formulation to implement these brushes. Other techniques are possible and contemplated, and thus other embodiments may employ other techniques to achieve similar effects.

Example Workflows

FIGS. 3A through 3H and FIGS. 4A through 4G illustrate example workflows using an embodiment of the soft edge masking module 100, according to some embodiments. In these example workflows, strokes may be applied, via a user interface to the soft edge masking module 100 such as those illustrated in FIGS. 2A and 2B, around all of the image areas for which the soft hair of the model needs to be brought out in the selection mask.

In some embodiments, the soft edge masking module 100 may be used in conjunction with a technique that automatically creates a border around the rough initial selection. The technique may provide a radius setting that provides partial detail near the selection edge, and brush strokes may then be applied using the soft edge masking module 100 and used to add additional detail of the soft feature (e.g., hair or fur) that should be included in the foreground but that were not captured using the automatic border creation technique.

Note that the images shown in FIGS. 3A through 3H and in FIGS. 4A through 4G were originally color images, and are described as being processed as color images, but have been converted to grayscale images for display purposes. As such, in describing some of the images, colors may be mentioned for regions of the images.

Figure 3C:
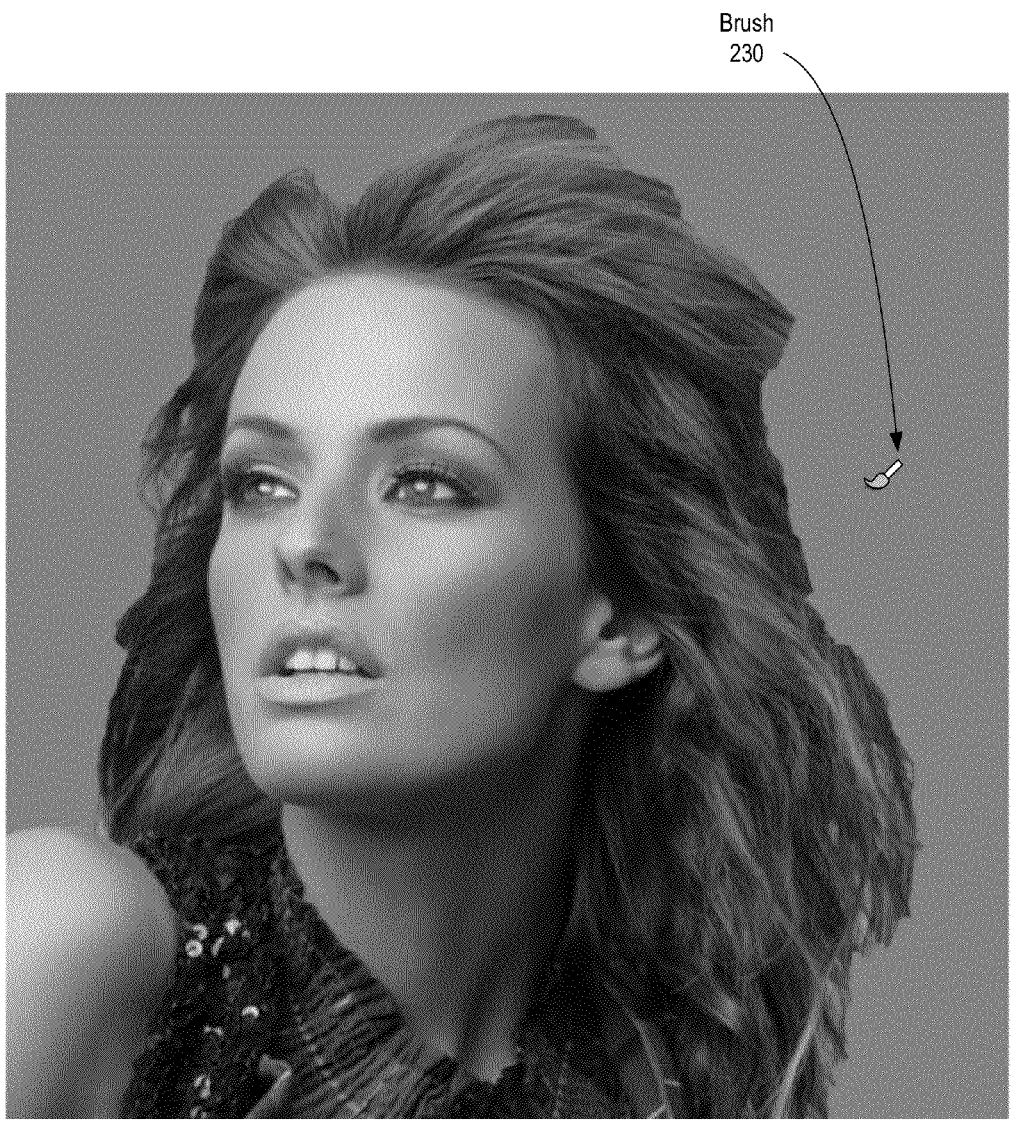

FIG. 3A shows an original image of a model. Note that the background of the original color image is slate blue. FIG. 3B shows a rough selection mask (see rough selection mask 110 of FIG. 1) generated for the image of FIG. 3A using some, possibly but not necessarily automatic, selection mask generation technique. FIG. 3C shows the working image of FIG. 3A, with the model matted against a green background using the rough selection mask shown in FIG. 3B. Note that the rough selection mask is hard and thus does not capture the softness and detail in the hair, as can be seen by comparing FIG. 3C to FIG. 3A. In FIG. 3C, the brush 230 is shown positioned over the working image; however, an initiating event (e.g., a mouse button down event) has not yet been performed.

Figure 3D:
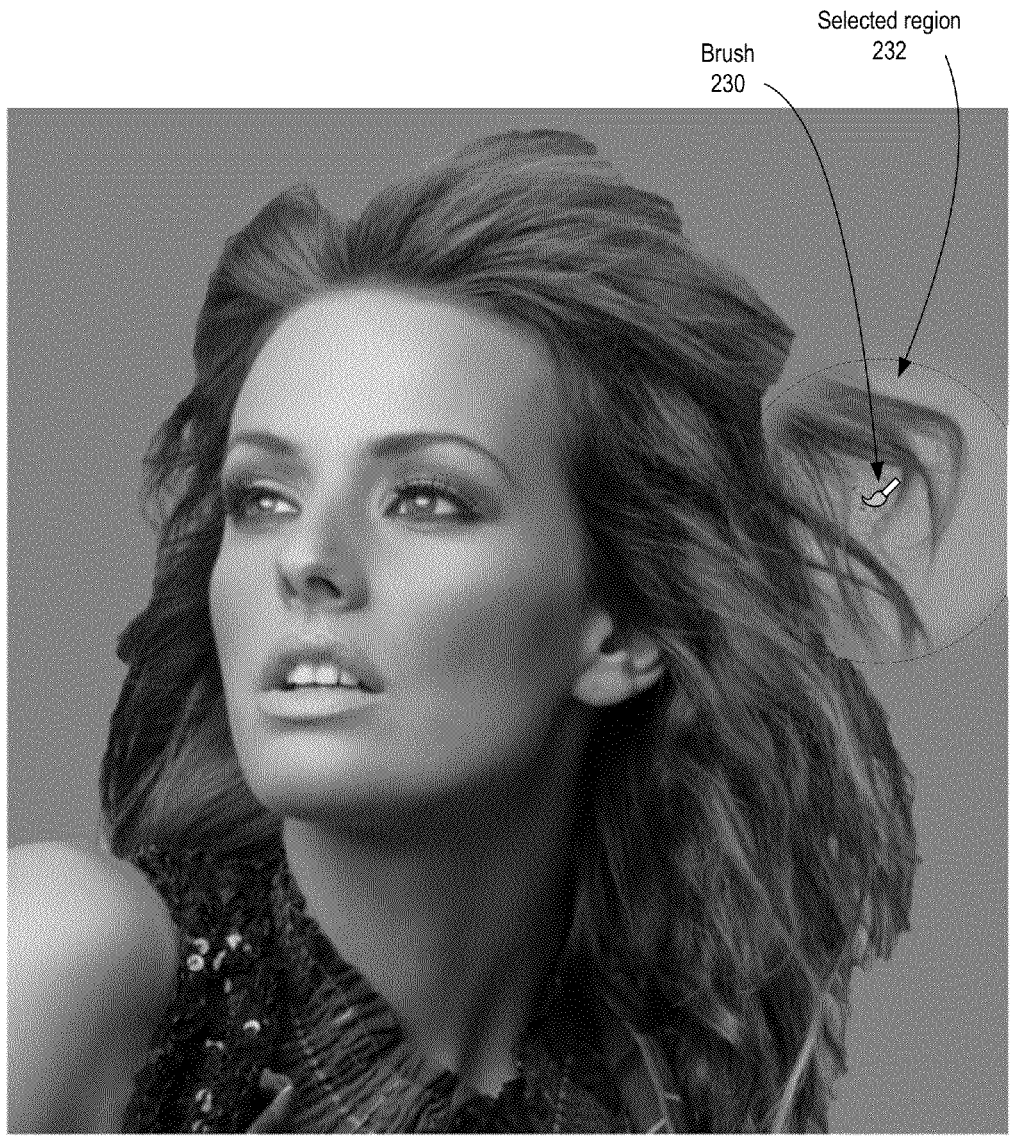

In FIG. 3D, an initiating event (e.g., a mouse button down event) has been performed. The dashed circle approximately indicates the region 232 selected by the brush stroke. While not clearly visible in this image, the background in this region 232 is the background from the original image shown in FIG. 3A.

Figure 3E:
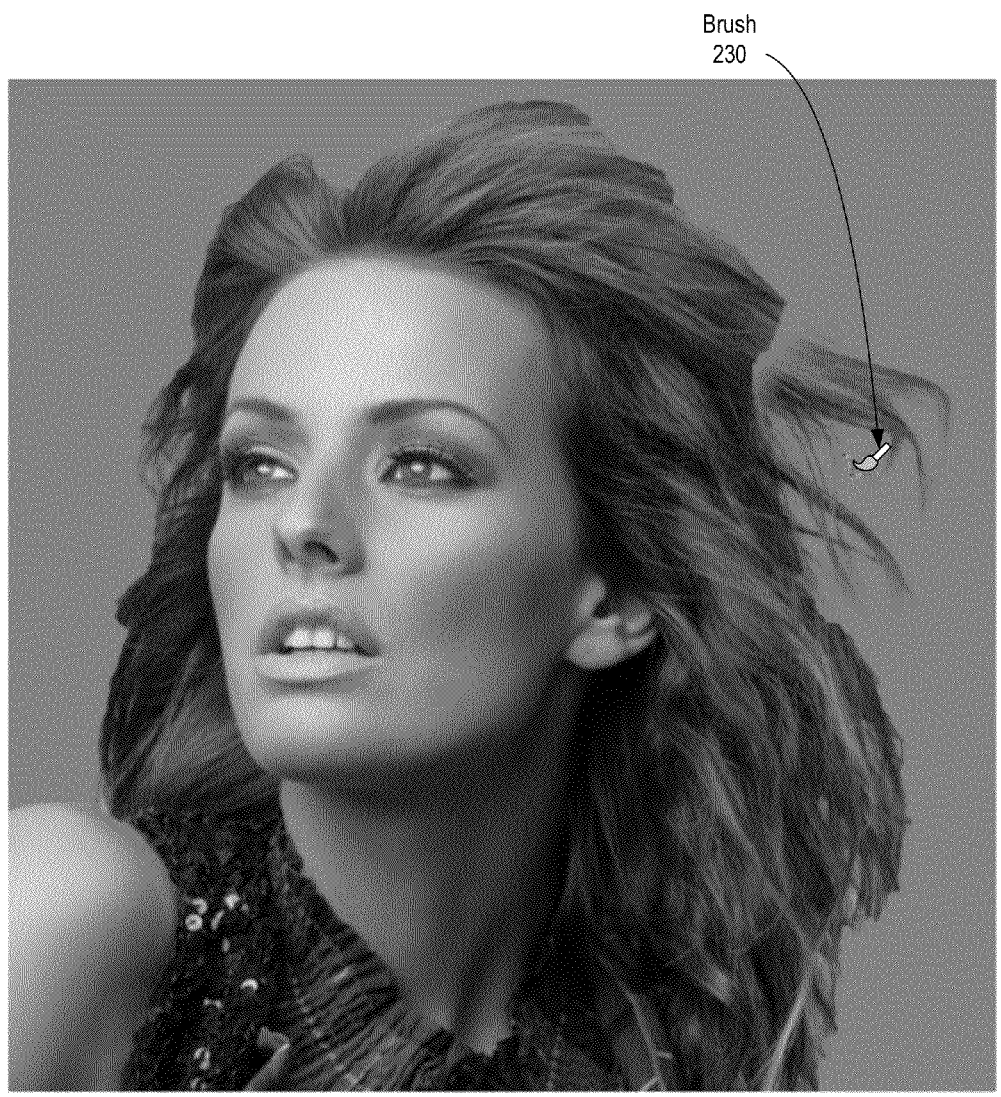

In FIG. 3E, an ending event (e.g., a mouse button released or up event) has been performed. FIG. 3E shows the results in the working image. The results are displayed so that the user receives immediate feedback. Note that the fine detail hair has been added to the image, and the background is now the background from the image shown in FIG. 3C rather than the background shown in FIG. 3A. Also note that, in some embodiments, the update may be displayed as the user is brushing (i.e., after the initiating event but before the ending event) rather than after the ending event.

A stroke may be performed on a single point. In other words, the user may position the brush over a point and perform an initiating event and an ending event over the point. In addition, a stroke may include multiple points. In other words, the user may position the brush over a point, perform an initiating event, move the brush, and perform an ending event. Thus, the brush may be used to "paint" a region that the user wishes to add more detail to.

Figure 3F:

FIG. 3F shows the modified selection mask after the stroke performed in FIGS. 3C through 3E has been applied to the mask.

FIGS. 3C through 3E show the brush stroke being applied to the displayed working image with the model matted against a green background using the rough selection mask shown in FIG. 3B. In some embodiments, the user interface to the soft edge masking module 100 may allow the user to selectively display the original image as shown in FIG. 3A and to apply brush strokes directly on the original image, with the results of the brush strokes being applied to the working image and the selection mask. This allows the user to more readily see the regions in which brush strokes may be needed.

The user may add additional strokes to the working image using the soft edge masking module 100 to add details in other areas of the image that were not captured by the original, rough selection mask. In some embodiments, an add mode and a subtract mode may be provided. In add mode, the user may use the brush to specify one or more regions in which additional detail is to be added to the selection mask. In subtract mode, the user may use the brush to remove detail from parts or all of previously specified regions that were added to the selection mask using the brush in add mode. In some embodiments, using the brush in subtract mode does not directly affect the original rough selection mask; that is, applying the brush in subtract mode only removes detail in regions that were added using the brush, and does not subtract from the original selection mask. Thus, the user may perform one or more strokes in subtract mode to remove detail in parts or all of previously specified regions that were added to the selection mask using the brush in add mode.

Figure 3G:
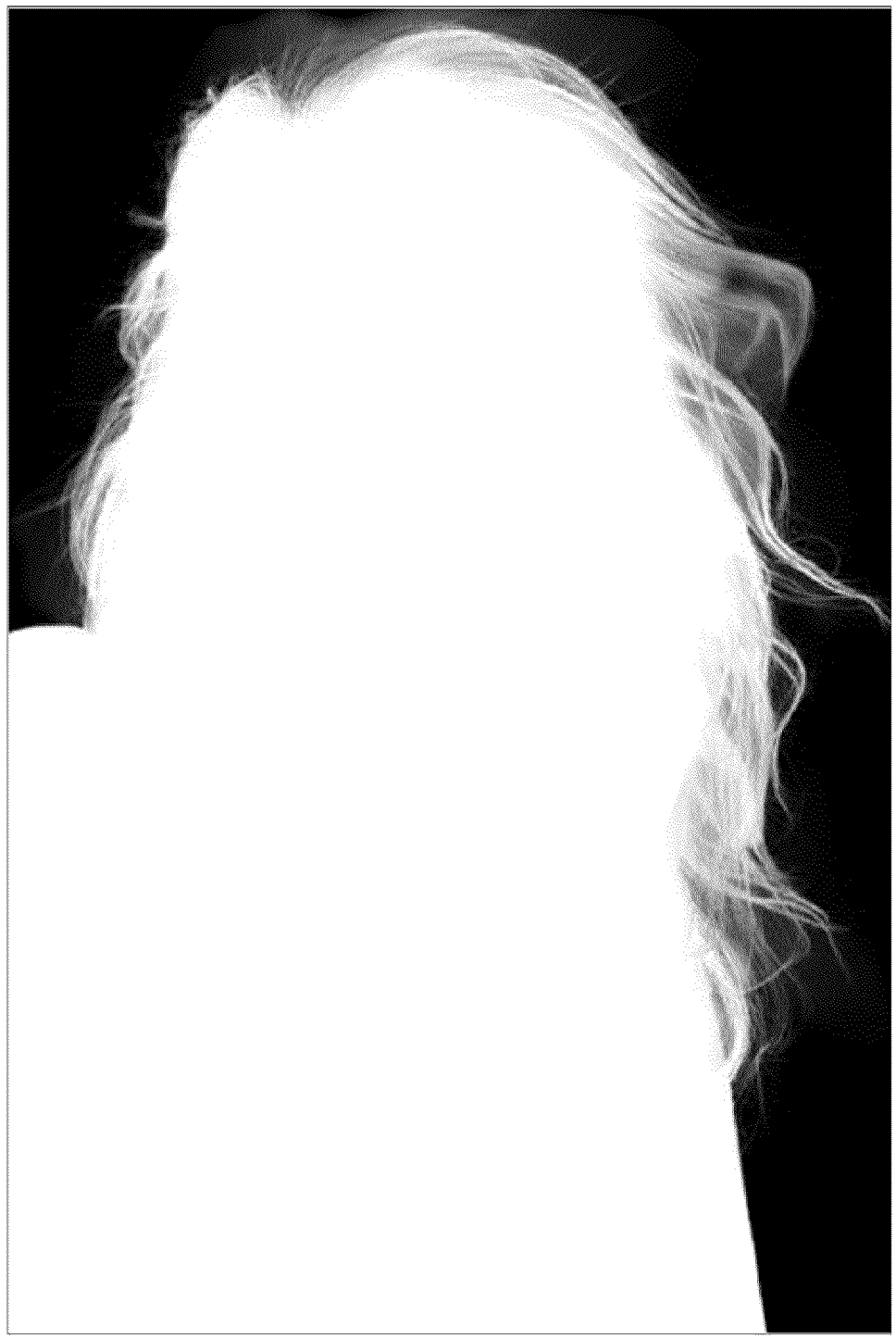
Figure 3H:
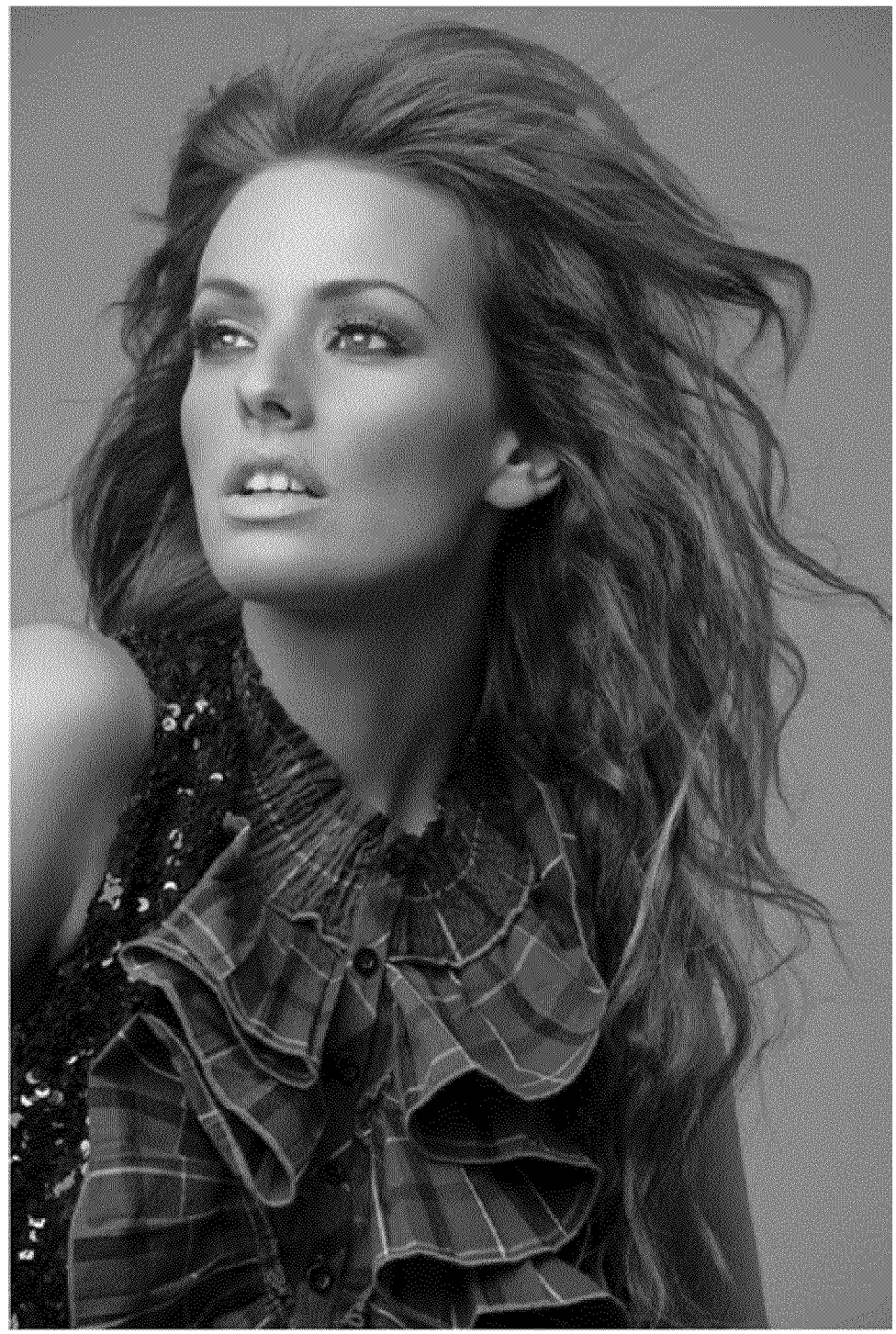

FIG. 3G shows an example, final selection mask after the user has completed selectively adding to the mask using the soft edge masking module 100. FIG. 3H shows a final composite image generated according to the selection mask of FIG. 3G. Other image processing techniques, such as color composting, may be applied to the final composite image.

Figure 4A:
FIGS. 4A through 4G illustrate an example workflow using an embodiment of the soft edge masking module, according to some embodiments.
Figure 4B:

FIG. 4A shows an original image. A selection technique has been used to select the foreground, as indicated by the dotted line. FIG. 4B shows a composite image that has the selected foreground shown in FIG. 4A matted onto a slightly darker background (a pale blue sky). Notice the areas around the hair where either undesired background from the original image shows through or where details in the hair shown in the original image are lost. A workflow using an embodiment of the soft edge masking module 100 may be used to refine the details in these areas.

Figure 4C:

FIG. 4C shows the composite image matted onto a dark background. A region 432 for mask refinement has been selected on the right side of the model's head using the soft edge masking module 100 brush. Note that the brush has not yet been applied on the left side of the model's head.

Figure 4D:
Figure 4E:
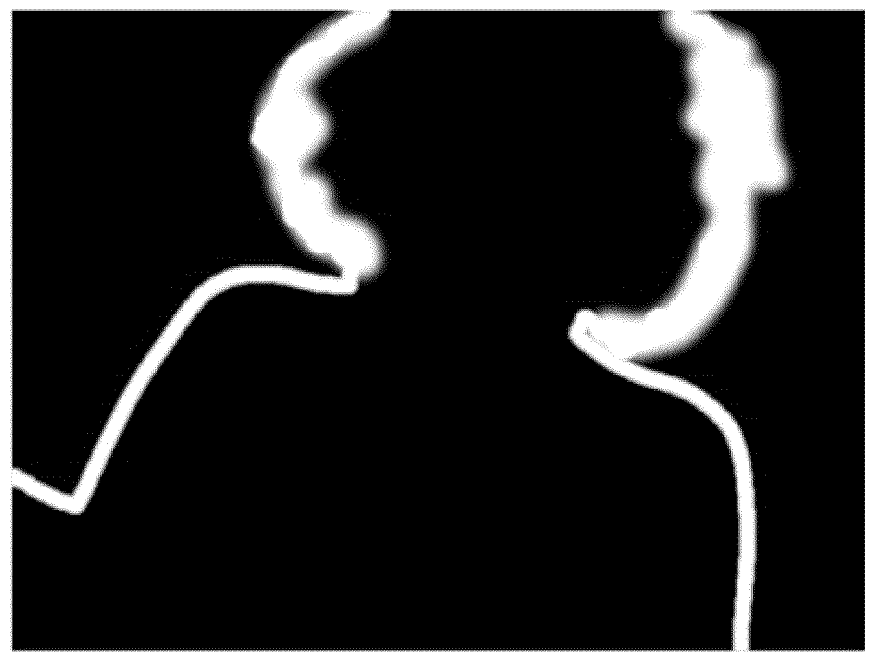

As previously noted, in some embodiments, the soft edge masking module 100 may be used in conjunction with a technique that automatically creates a border around the rough initial selection. The technique may provide a radius setting that provides partial detail near the selection edge, and brush strokes may then be applied using the soft edge masking module 100 and used to add additional detail of the soft feature (e.g., hair or fur) that should be included in the foreground but that were not captured using the automatic border creation technique. FIG. 4D shows an automatically generated border mask around the original rough selection shown in FIG. 4A using a radius of 10. FIG. 4E shows the border of FIG. 4D after brush strokes have been added using the using the soft edge masking module 100 brush.

Figure 4F:
Figure 4G:

FIG. 4F shows an example refined selection mask generated from the original image, the initial selection mask, and the brush strokes on the border as illustrated in FIG. 4E. FIG. 4G shows an example final composite image generated using the refined selection mask shown in FIG. 4F. Note the fine details that have been brought out in the model's hair when compared to the rough selection shown in FIG. 4B.

Border Masks and Brush Stroke Masks

In some embodiments, the border mask and the brush strokes may be maintained separately, for example as separate pixel maps or masks. In some embodiments, the border mask is generated first. The user may then apply one or more brush strokes. The brush strokes may include additive strokes using the brush in add mode to add to the border, or subtractive strokes using the brush in subtract mode to erase or thin the border in places. The brush stroke information may be stored separately from the generated border mask so that the user can go back and change the border mask, for example by changing a radius used to generate the border mask, and then re-apply the previously drawn brush strokes to the modified border mask. Thus, the strokes are not invalidated when the border mask is changed.

In some embodiments, the brush strokes may be maintained as two masks. One mask indicates where any type of brushing has occurred (e.g., both additive and subtractive brushing). Another mask indicates where additions and subtractions have been done. For example, this mask may include light gray and dark gray values; the light values indicate where adding has been done, and the dark values indicate where subtracting has been done. Other embodiments may maintain the brush stroke information using other techniques.

Flowchart of a Method for Soft Edge Masking

Figure 5:
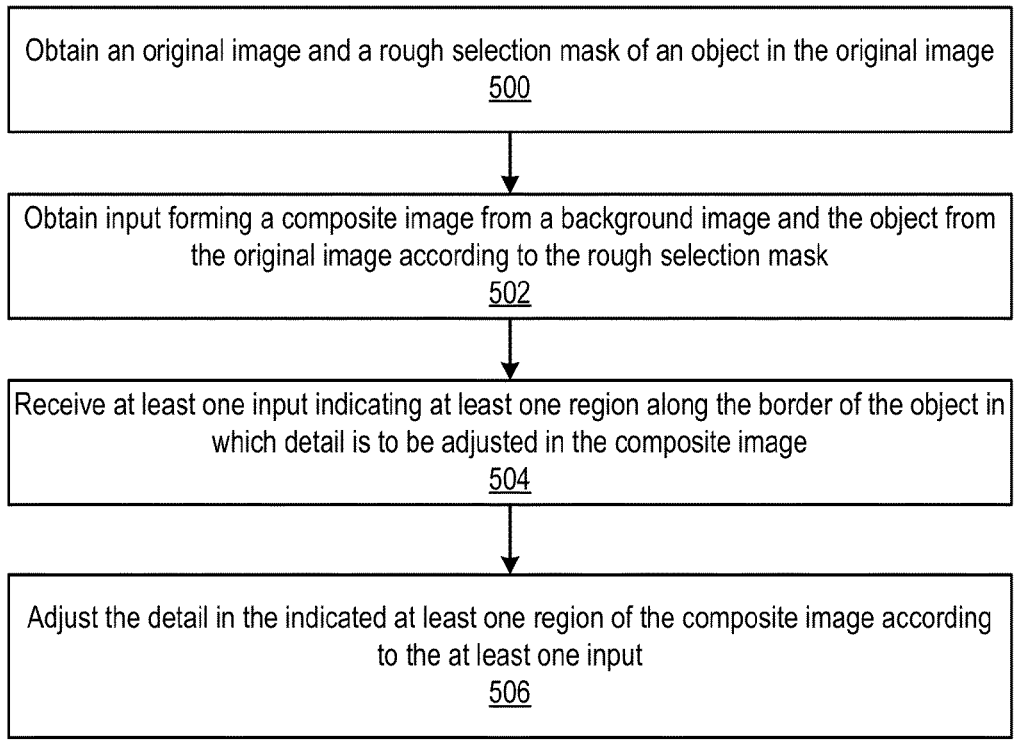
FIG. 5 is a flowchart of a method for soft edge masking according to some embodiments.

FIG. 5 is a flowchart of a method for soft edge masking according to some embodiments. As indicated at 500, an original image (see, for example, FIG. 3A) and a rough selection mask of an object in the original image (see, for example, FIG. 3B) may be obtained. The rough selection mask may be generated by any of a variety of manual or automatic techniques, or by a technique that combines manual actions with automatic mask generation. As indicated at 502, input may be obtained to form a composite image from a background image and the object from the original image selected according to the rough selection mask (see, for example, FIG. 3C).

As indicated at 504, at least one input may be received indicating at least one region along the border of the object in which detail is to be adjusted in the composite image. For example, a brush tool may be provided through a user interface to a soft edge masking module 100 via which the user may draw strokes on the composite image (or, alternatively, on the original image) to indicate the one or more regions. In some embodiments, an input (e.g., a stroke) may be an additive input indicating a particular region in which detail from the original image is to be added to the composite image, or a subtractive input indicating a particular region in which detail is to be removed from the composite image. The input (e.g., a stroke) may also indicate a strength parameter value that may be used to indicate an amount of bias to be used in opacity calculations for the affected pixels.

As indicated at 506, detail in the indicated at least one region of the composite image may be adjusted according to the at least one input. To add detail in the composite image, the initial selection mask is modified to generate a refined selection mask, and the refined selection mask is then used to add the detail from the original image to the composite image. Detail from the original image may be added to the composite image using additive input (e.g., a stroke in add mode), or detail may be subtracted from the composite image using subtractive input (e.g., a stroke in subtract mode). A strength parameter value may be associated with each input (e.g., with each stroke), and may be used to bias the amount of detail that is added to or removed from the composite image via the refined selection mask.

Example System

Embodiments of a soft edge masking module as described herein may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and touch- or multitouch-enabled device(s) 1090. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a soft edge masking module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement embodiments of a soft edge masking module as described herein, and data storage 1035, comprising various data accessible by program instructions 1025. In one embodiment, program instructions 1025 may include software elements of embodiments of a soft edge masking module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a soft edge masking module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    obtaining an initial selection mask of an object in an original image, wherein the initial selection mask indicates a foreground area of the original image to be included in the selected object and a background area of the original image;
    obtaining one or more inputs each specifying a different region of the original image in which foreground detail is to be refined; and
    refining the initial selection mask according to image data in each of the specified one or more regions of the original image to generate a refined selection mask, wherein said refining comprises:
        determining one or more foreground colors and one or more background colors from the original image according to the initial selection mask;
        determining foreground pixels and background pixels in each of the specified one or more regions of the original image according to the determined foreground colors and background colors; and
        refining the initial selection mask according to the determined foreground pixels and background pixels in each of the specified one or more regions of the original image.

2. The computer-implemented method as recited in claim 1, further comprising generating a composite image by masking the foreground area of the original image indicated by the refined selection mask onto a background image.

3. The computer-implemented method as recited in claim 1, wherein the one or more inputs are brush strokes applied to an image displayed on a user interface via a brush tool provided by the user interface.

4. The computer-implemented method as recited in claim 3, wherein the image displayed on the user interface to which the brush strokes are applied is one of the original image, the selection mask, and the composite image.

5. The computer-implemented method as recited in claim 3, wherein the user interface further provides at least one user interface element for adjusting a value for a brush strength parameter over a range from a highest setting to a lowest setting, wherein the brush strength parameter value biases how much detail is brought out in regions specified by the brush strokes when refining the selection mask, and wherein a higher value for the brush strength parameter brings out more detail in a specified region than a lower value for the brush strength parameter.

6. The computer-implemented method as recited in claim 3, wherein the user interface further provides at least one user interface element for specifying a width value for the brush, wherein the width value specifies width of the brush strokes applied using the brush tool.

7. The computer-implemented method as recited in claim 3, wherein the user interface further provides at least one user interface element for selecting from among two or more brush modes, wherein the two or more brush modes include an additive brush mode and a subtractive brush mode, wherein the additive brush mode is used to apply strokes that specify regions of the original image from which additional foreground detail is to be added via refinement of the initial selection mask, and wherein the subtractive brush mode is used to apply strokes that specify regions of the original image from which foreground detail is to be subtracted via refinement of the initial selection mask.

8. The computer-implemented method as recited in claim 1, wherein at least one of the one or more inputs is an additive input that specifies a particular region of the original image from which additional foreground detail is to be added via refinement of the initial selection mask.

9. The computer-implemented method as recited in claim 1, wherein at least one of the one or more inputs is a subtractive input that specifies a particular region of the original image from which foreground detail is to be subtracted via refinement of the initial selection mask.

10. The computer-implemented method as recited in claim 1, wherein at least one of the one or more inputs further specifies a strength value for the input, wherein the strength value biases how much detail is brought out in regions specified by the brush strokes when refining the selection mask, and wherein a higher strength value brings out more detail in a specified region than a lower strength value.

11. The computer-implemented method as recited in claim 1, further comprising obtaining a border mask for the initial selection mask, wherein the border mask specifies a region on at least one side of the edge of the initial selection mask that includes, for at least a portion of the border mask, a mixture of foreground and background from the original image, wherein pixels within the region specified by the border mask are not used in said determining foreground colors and background colors from the original image according to the initial selection mask.

12. The computer-implemented method as recited in claim 1, further comprising obtaining a border mask for the initial selection mask, wherein the border mask specifies a region on at least one side of the edge of the initial selection mask that includes, for at least a portion of the border mask, a mixture of foreground and background from the original image, and wherein said refining the initial selection mask according to image data in each of the specified one or more regions of the original image to generate a refined selection mask comprises:
   refining the border mask according to the image data in each of the specified one or more regions of the original image; and
   refining the initial selection mask according to the refined border mask to generate the refined selection mask.

13. The computer-implemented method as recited in claim 1, wherein, in said refining the initial selection mask according to image data in each of the specified one or more regions of the original image to generate a refined selection mask, at least some pixels in the refined selection mask indicate an opacity value at the respective pixels between a background opacity value B and a foreground opacity value F and thus indicate a mixture of foreground and background at the respective pixels, where B indicates fully background and F indicates fully opaque and thus fully foreground.

14. A system, comprising:
   at least one processor; and
   a memory comprising program instructions, wherein the program instructions are executable by the at least one processor to:
      obtain an initial selection mask of an object in an original image, wherein the initial selection mask indicates a foreground area of the original image to be included in the selected object and a background area of the original image;
      obtain a border mask for the initial selection mask, wherein the border mask specifies a region on at least one side of the edge of the initial selection mask that includes, for at least a portion of the border mask, a mixture of foreground and background from the original image;
      obtain one or more inputs each specifying a different region of the original image in which foreground detail is to be refined; and
      refine the initial selection mask according to image data in each of the specified one or more regions of the original image to generate a refined selection mask, wherein said refine comprises:
         refine the border mask according to the image data in each of the specified one or more regions of the original image; and
         refine the initial selection mask according to the refined border mask to generate the refined selection mask.

15. The system as recited in claim 14, wherein the system further comprises a display device and an input device, wherein the one or more inputs are brush strokes applied to an image displayed on the display device via the input device, wherein the input device is one of a cursor control device, a touch-enabled device, and a multitouch-enabled device, and wherein the image displayed on the display device to which the brush strokes are applied is one of the original image, the selection mask, and the composite image.

16. The system as recited in claim 14, wherein the system further comprises a display device, wherein the program instructions are executable by the at least one processor to display at least one user interface element to the display device for adjusting a value for a strength parameter over a range from a highest setting to a lowest setting, wherein the strength parameter value biases how much detail is brought out in regions specified by the inputs when refining the selection mask, and wherein a higher value for the strength parameter brings out more detail in a specified region than a lower value for the strength parameter.

17. The system as recited in claim 14, wherein the system further comprises a display device, wherein the program instructions are executable by the at least one processor to display at least one user interface element to the display device for selecting from among two or more input modes, wherein the two or more input modes include an additive mode and a subtractive mode, wherein the additive mode is used to apply inputs that specify regions of the original image from which additional foreground detail is to be added via refinement of the initial selection mask, and wherein the subtractive mode is used to apply input that specify regions of the original image from which foreground detail is to be subtracted via refinement of the initial selection mask.

18. A non-transitory computer-readable storage medium storing program instructions, wherein the program instructions are computer-executable to implement:
   obtaining an initial selection mask of an object in an original image, wherein the initial selection mask indicates a foreground area of the original image to be included in the selected object and a background area of the original image;
   obtaining one or more inputs each specifying a different region of the original image in which foreground detail is to be refined; and
   refining the initial selection mask according to image data in each of the specified one or more regions of the original image to generate a refined selection mask, wherein said refining comprises:
      determining one or more foreground colors and one or more background colors from the original image according to the initial selection mask;
      determining foreground pixels and background pixels in each of the specified one or more regions of the original image according to the determined foreground colors and background colors; and
      refining the initial selection mask according to the determined foreground pixels and background pixels in each of the specified one or more regions of the original image.

19. The non-transitory computer-readable storage medium as recited in claim 18, wherein the one or more inputs include at least one additive input that specifies a particular region of the original image from which additional foreground detail is to be added via refinement of the initial selection mask and at least one subtractive input that specifies a particular region of the original image from which foreground detail is to be subtracted via refinement of the initial selection mask.

20. The non-transitory computer-readable storage medium as recited in claim 18, wherein at least one of the one or more inputs further specifies a strength value for the input, wherein the strength value biases how much detail is brought out in regions specified by the brush strokes when refining the selection mask, and wherein a higher strength value brings out more detail in a specified region than a lower strength value.

* * * * *